United States Patent [19]

Slettenmark

[11] Patent Number: 4,553,147
[45] Date of Patent: Nov. 12, 1985

[54] METHOD AND A LIQUID JET PRINTER FOR GENERATING AT LEAST TWO SEPARATELY DISPOSED POINTS ON A RECORDING MEDIUM

[75] Inventor: Bruno Slettenmark, Jaerfaella, Sweden

[73] Assignee: Siemens Aktiengesellschaft, Berlin & Munich, Fed. Rep. of Germany

[21] Appl. No.: 540,805

[22] Filed: Oct. 11, 1983

[30] Foreign Application Priority Data

Oct. 12, 1982 [DE] Fed. Rep. of Germany ....... 3237797

[51] Int. Cl.⁴ ................... G01D 15/18; G01D 9/40; G01D 9/00
[52] U.S. Cl. .................................... 346/75; 346/1.1; 346/62; 346/33 ME
[58] Field of Search .............. 346/62, 75, 33 ME, 1.1

[56] References Cited

U.S. PATENT DOCUMENTS

| 2,566,443 | 9/1951 | Elmqvist | 346/75 |
| 4,040,063 | 8/1977 | Berglund | 346/62 X |
| 4,062,020 | 12/1977 | Berglund | 346/75 X |
| 4,100,550 | 7/1978 | Elmqvist et al. | 346/75 X |
| 4,268,837 | 5/1981 | Orzikowski | 346/75 |

FOREIGN PATENT DOCUMENTS 2434905 1/1976 Fed. Rep. of Germany .

Primary Examiner—George H. Miller, Jr.
Attorney, Agent, or Firm—Hill, Van Santen, Steadman & Simpson

[57] ABSTRACT

In an exemplary embodiment writing fluid is continuously supplied from a nozzle toward a recording medium. The nozzle is subjected to excursion by a corresponding angle in order to change between the two points to be printed. In order to improve the recording quality and the recording speed the nozzle is subject to high-speed excursion upon transition between the points in accord with such a time function $\phi(t)$ that the writing fluid is always moved in the direction toward the new point after it has departed the nozzle. The time function can be set by means of a suitable selection of the parameters of the printer. The excursion signal can likewise be correspondingly shaped or the excursion can be effected by a feedback control loop.

16 Claims, 7 Drawing Figures

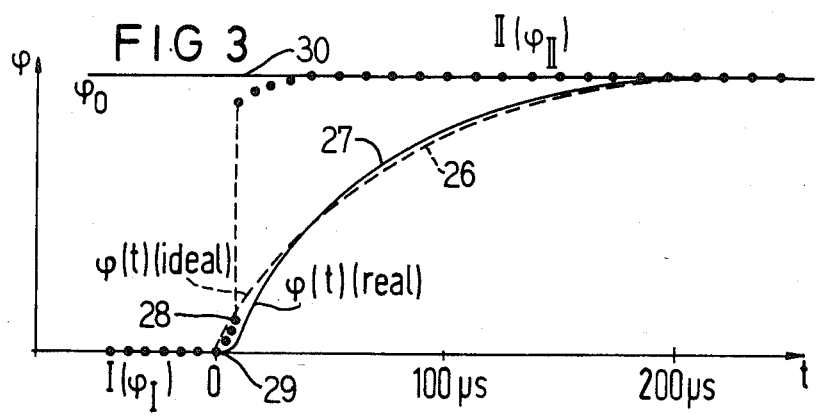
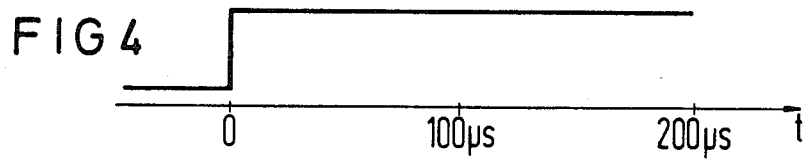
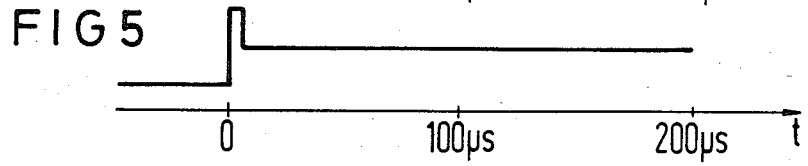
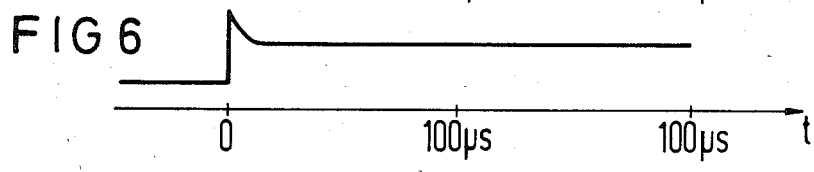
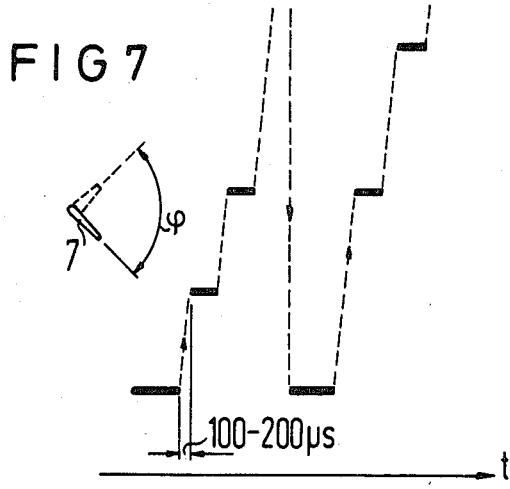

METHOD AND A LIQUID JET PRINTER FOR GENERATING AT LEAST TWO SEPARATELY DISPOSED POINTS ON A RECORDING MEDIUM

BACKGROUND OF THE INVENTION

The invention relates to a method for generating at least two separately disposed points on a recording medium of a liquid jet printer, wherein writing fluid is continuously supplied from a nozzle in the direction toward the recording medium with a prescribable speed and, for the purpose of changing between the points, the nozzle is subject to high speed excursion or deflection through an angle corresponding to the distance between the points. The invention also relates to a liquid jet printer for the implementation of this method.

Liquid jet printers for both medical and technical applications are known for recording signals having frequency components above one kHz. The essential component part of the printer may comprise a thin glass capillary to which a small permanent magnet is secured. The end of said capillary is bent at about 90° and is drawn into a jet nozzle configuration. Writing fluid is continuously ejected through the nozzle by a pump system for impingement on a recording paper moving with a prescribed speed e.g. at a constant velocity in the simplest case. The signal to be recorded is applied to a deflecting coil which subjects the permanent magnet and, thus, the capillary tip to angular excursion. The torsional force of the glass capillary during angular deflection of the nozzle represents the restoring force for the mechanical oscillation system. For purposes of damping, the mechanical system is at least partially immersed in oil in order to obtain desired dynamic conditions. In the simplest case, continuous measured curves representing, for example, ECG (electrocardiograph) or EEG (electroencephalograph) signals are recorded with the assistance of such a liquid jet printer.

The application of the liquid jet printer could also be expanded to recording alpha-numerical characters or recording a plurality of signals simultaneously with one logger with the assistance of so-called velocity modulation whose principle is known, for example, from the German published application No. DE-A-2434905. The essential feature for this is that the liquid jet sequentially skips between the positions at which a recording is to be undertaken. When, for example, two points disposed at a distance from one another are to be recorded, then the jet dwells in these respective positions for a short time (for example, 100 microseconds). The jet covers the space between the two points as quickly as possible in order to minimize any spurious patterns or background produced by the continuous ejection of fluid.

SUMMARY OF THE INVENTION

The object of the present invention is to improve the method initially described in such manner that a significant enhancement of the recording quality and, in addition, that an increase of the recording speed are enabled. This object is inventively achieved by deflecting the nozzle according to a time function such that the visually observable portions of the writing fluid either are deposited near the initial writing position on the recording medium or are accelerated in a direction so as to impinge essentially at the new writing position. The invention is based on the surprising perception that—despite the finite skip rate between the points to be recorded which is due to the inertia of the mechanical system—it is possible to avoid the undesired background caused by the writing fluid. The writing fluid that was lost on the way from one recording location to the other and which formed the disruptive background is now advantageously deflected to that location at which a recording is to be undertaken. By this the contrast and the sharpness of the edge are increased.

Since the writing fluid that was hitherto lost now also contributes to the recording, sufficient blackening is achieved with a shorter dwell time of the jet in the direction toward the location provided for the respective recording. That means that the recording speed can also be considerably increased.

According to the present invention, the nozzle is no longer pivoted with constant angular velocity when changing from one recording location to the other but, rather, according to a time function representing an abrupt initial angular acceleration of the jet sufficient to abruptly produce a resultant velocity of the liquid medium toward the new writing location. A simple method of producing such a time function consists of matching the parameters of the liquid printer such as length of the nozzle to its orifice, velocity component of the fluid in the direction of the nozzle axis, resonant frequency of the printing system and damping factor of the system to one another in a corresponding fashion. One advantage with such a matching is that a simple, step-shaped deflection signal can continue to be used for the excursion of the nozzle.

It is additionally or alternatively provided in a further development of the invention to employ the drive signal for the excursion of the nozzle for generating the desired time function of the excursion. In this case, the drive signal can be generated on line in an arithmetic unit or can be fetched from a memory.

Further, it is likewise advantageously possible to employ non-linear or non-classic damping agents in order to match the excursion of the print system to the ideal time function. A further possibility consists of supplying the respective nozzle position as a feedback signal to a control system for representing the actual value, the ideal curve being supplied to the control system as the commanded desired value. The guidance of the nozzle can be precisely matched to the desired time curve with the assistance of such a closed control loop without having to take the mechanical parameters of the system into consideration in selecting the waveform of the command input.

Further advantages of the invention derive from the dependent patent claims and from the exemplary embodiments which are described and explained in greater detail below with reference to seven figures of drawings; and other objects, features and advantages will be apparent from this detailed disclosure and from the appended claims.

BRIEF DESCRIPTION OF THE DRAWINGS

FIG. 3 is a graphical illustration showing ideal and actual excursion time functions for the nozzle of the liquid jet printer and the resultant location on the writing medium of successive liquid droplets;

FIGS. 4-6 illustrate various waveforms for the drive signal for effecting a desired excursion of the nozzle according to the present invention; and FIG. 7 shows an example where the method and apparatus of the present invention are utilized.

DETAILED DESCRIPTION

Figure 1:
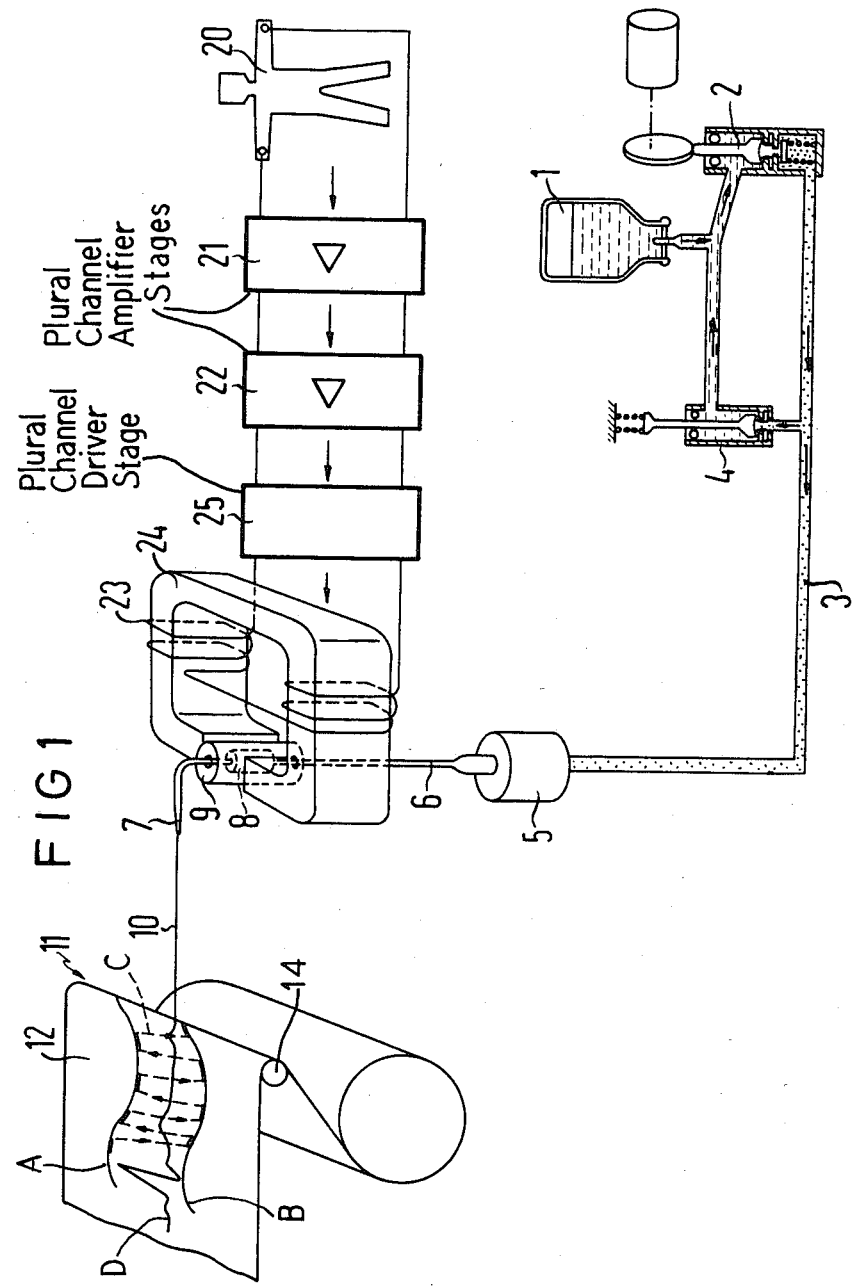
FIG. 1 shows a schematic illustration of a liquid jet printer according to the invention.

FIG. 1 essentially shows a known liquid jet printer wherein fluid proceeds from a supply reservoir 1 by means of a pump arrangement 2, proceeding over a line 3 which may contain a pressure control stage 4 under given conditions and a filter 5 to the capillary 6. The capillary is angled off at its frontal end by about 90° and terminates in a jet or nozzle 7. A permanent magnet 8 is situated in a housing 9 containing a damping agent, for example oil. Writing fluid 10 is continuously ejected from the jet or nozzle 7 in the direction of the recording medium 11. In the present exemplary embodiment, the recording medium consists of a continuous paper web 12 guided over rollers such as 14 and moved with a prescribable e.g. constant speed. It is assumed by way of example in FIG. 1 that an electrical signal is to be tapped at a person 20 and recorded. The signal is applied to a coil 23 via a pre-amplifier 21 and a final amplifier 22. A ferromagnetic core 24 has a gap receiving the capillary 6 with the permanent magnet 8 so that the magnetic field generated by the coil 23 deflects the jet or nozzle 7 in accord with the applied signal while the base of capillary 6 at filter 5 is fixed. The restoring force is determined by the torsional stiffness of the glass capillary 6.

Let it now be assumed in the present case that two different signals whose courses as a functin of time are to be recorded are simultaneously tapped at the person 20. The recording of two such plots (e.g. as indicated at A and B, FIG. 1) occurs with the assistance of a driver stage 25, for example a chopper, with whose assistance the fluid jet skips back and forth (as indicated by dash line C, FIG. 1) between the two signal progressions to be recorded with a sufficiently high frequency, for example 500 Hz. This progression is schematically indicated on the recording medium 11 as an alternative to the recording of a single waveform (e.g. at D). How it is thereby achieved that writing fluid proceeds onto the recording medium only in the area of the curves to be recorded (i.e. as represented at A and B, FIG. 1) and does not produce any disruptive background blackening when skipping between them (i.e. in the region between curves A and B) shall be explained in detail with reference to the following figures.

Figure 2:
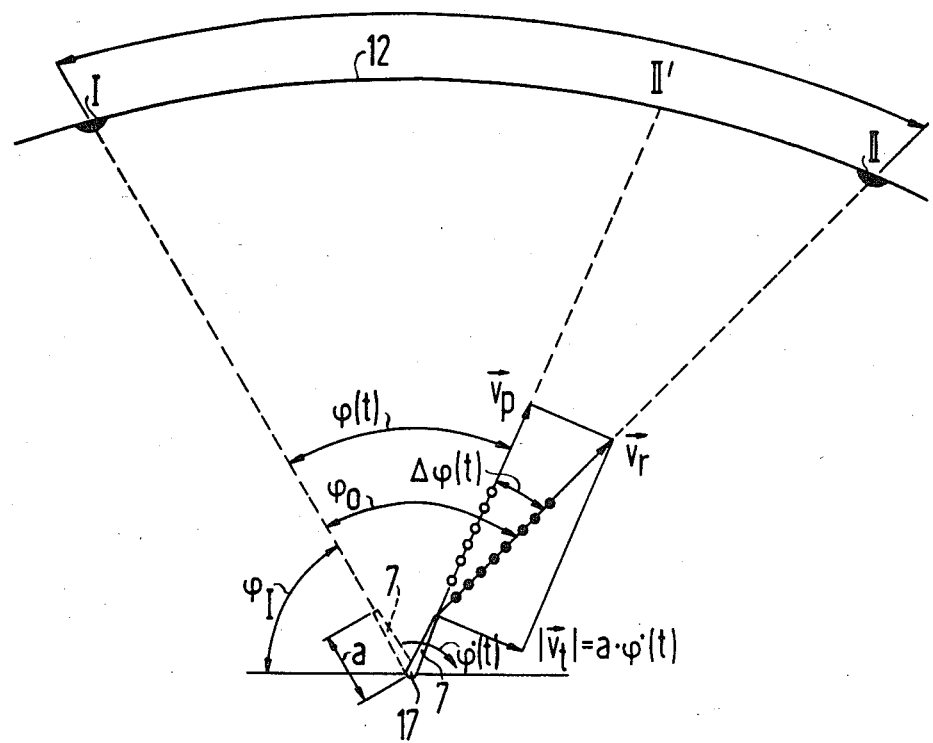
FIG. 2 is a geometrical presentation of the inventive method.

The principle shall be explained in greater detail with reference to FIG. 2. In order to facilitate understanding and in order to present the calculation of the relationships in a surveyable manner, it is assumed that the recording paper 12 is cylindrically bent and concentrically disposed relative to the rotational axis 17 of the jet or nozzle 7. The movement of the paper is perpendicular to the plane of the drawing. Two points I and II respectively are now to be recorded (e.g. one on curve A and one on curve B in FIG. 1). As indicated with broken lines, the jet or nozzle 7 is initially pointed in the direction toward point I and has an angular position $\phi_I$. The jet or nozzle 7 is now to be quickly rotated out of this position by an angle $\phi_O$ which corresponds to the spacing between the two points I and II to be recorded. The length of the nozzle 7 is referenced 'a'. The liquid jet or stream which departs the nozzle 7 has a velocity component $\vec{V}_p$ in the direction of the nozzle axis due to the pressure exerted. Shortly after emerging from the nozzle 7, the fluid stream breaks up into a chain of individual droplets similar to a string of pearls, this being caused by instabilities and surface tension in the free fluid column. Let it now be assumed that the nozzle 7 at a time t has an angular excursion velocity $\dot{\phi}$ (t) and, thus, a transversal velocity $|\vec{v}_t| = a \cdot \dot{\phi}(t)$. This transversal velocity must be vectorially added to the velocity in the nozzle direction $\vec{V}_p$. At time t, a resultant velocity $\vec{v}_r$ thus derives for the drop leaving the nozzle opening at point in time t. This drop strikes the recording paper 12 at point II and not at point II' to which the nozzle 7 is directed. The essence of the inventive method is to always select the angular velocity $\dot{\phi}$ (t) upon transition from I to II such that the resultant velocity at every point in time t of the corresponding liquid droplets is directed in the direction toward point II. Due to the special arrangement of the recording paper 12 undertaken here, the time function of t derived below by way of implication is exact for all distances between two points to be recorded and for all starting positions of the jet or nozzle 7. Even though the recording plane is flat in practical operation and the derivation must be corrected to that effect, these corrections are so slight that they can usually be ignored.

$$\phi (t) \text{ derives at } \phi (t) = \int_0^t \dot{\phi} (t') \, dt'$$

$$\phi = \phi_o = \phi (t) + \Delta \phi (t) = \phi (t) + \arctan \frac{a \cdot \dot{\phi} (t)}{v_p}$$

follows for $t = \infty$ following therefrom at the starting time $t = 0$ is $$\phi_o = \arctan \frac{a \cdot \dot{\phi} (0)}{v_p} \; ; \; \dot{\phi} (0) = \frac{v_p}{a} \tan \phi_o$$

from which it follows that $$\phi_o = \int_0^t \dot{\phi}(t') \, dt' + \arctan \frac{a \cdot \dot{\phi} (t)}{v_p}$$

$\phi (t)$, finally, is calculated therefrom at $$\phi (t) = \int_0^t \dot{\phi} (t') \, dt' = \arcsin \left[ \frac{\tan \phi_o}{\sqrt{\tan^2 \phi_o + 1}} \right] -$$

$$\arcsin \left[ \frac{\tan \phi_o}{\sqrt{\tan^2 \phi_o + 1}} \cdot e^{-\frac{v_p}{a} t} \right]$$

In FIG. 3, the chronological progression $\phi$ (t) is illustrated as a function of the time t. The ideal curve is approximately specified with broken line 26 in FIG. 3. At point in time $t=0$, this function has a discontinuous derivative, i.e. an infinite acceleration of the nozzle would be required at this point in order to achieve the ideal recording case that the liquid droplets from this point in time on would all impinge upon the recording medium directly at the point II, (see FIG. 2). At least in its initial area, the practically attainable curve 27 would deviate from the ideal curve 26 so that an undesired, short "tail" of the skipping liquid jet as indicated by the dots 28 would remain. For short and moderate skip distances, however, this tail will lie practically within the previously recorded point, (i.e. as represented by dot 29) and will therefore not be visibly disturbing. This slight edge disruption is not perceptible to the naked eye even for greater skip distances.

It is further indicated in FIG. 3 that all droplets are directed in the direction toward the point I up to a point in time $t=0$ and that the drops already arrive in the vicinity of point II a few microseconds after the nozzle has been pivoted out of said direction toward point I. It is assumed in the present example that the pivot event of the nozzle 7 is concluded after approximately 200 microseconds (as is represented by curve 27 reaching the line 30 at $t=200$ microseconds, FIG. 3).

As already mentioned, the time function $\phi$ (t) can already be set in a simple manner by matching the parameters of the liquid jet printer. As can be seen from FIG. 3, the curve 27 approximately corresponds to that of an overdamped oscillator. The proper behavior can thus be simulated by selecting the parameters influencing the oscillatory behavior. A simple, step-shaped drive signal as a function of time as illustrated in FIG. 4, thus, already suffices for the transition from one point to another. FIGS. 5 and 6, respectively, likewise show modified drive signals as a function of time, the matching of the real time function such as 27, FIG. 3, to the ideal as at 26, FIG. 3, being capable of further improvement with their assistance.

An example of the use of the inventive method for velocity modulation in a liquid jet printer is schematically illustrated in FIG. 7. The jet or nozzle is again referenced 7, being pivotable through an angle $\phi$. The recording attained as a function of time is illustrated next to it. The direction in which the transition between the recorded points ensues is indicated by arrows. In this examplary embodiment, thes points are to be arranged corresponding to a matrix so that alpha-numerical characters can be formed with them in a known manner.

German published patent application 24 34 905 and the corresponding U.S. application Ser. No. 596,414 filed July 16, 1975 (now abandoned) are incorporated herein by reference by way of background.

It will be apparent that many modifications and variations may be made without departing from the scope of the teachings and concepts of the present invention.

I claim as my invention:

1. In a method for generating at least two separately disposed points on a recording medium of a liquid jet printer, wherein writing fluid is continuously supplied from a nozzle in the direction toward the recording medium with a prescribable speed and, for the purpose of changing between the points, the nozzle is moved at high speed through an angle corresponding to the spacing between the points, the improvement of:
   moving the nozzle through said angle upon transition from the one point to the other point according to such a selected time function such that the writing fluid always moves substantially in the direction toward the other point on said recording medium after departing the nozzle, as soon as the nozzle moves away from said one point for preventing printing of writing fluid on said recording medium between said two points.

2. A method according to claim 1 wherein the time function is selected by selecting the printer parameters.

3. A method according to claim 2 wherein a drive signal for moving the nozzle is employed for generating the selected time function.

4. A method according to claim 3 wherein the drive signal is generated on line in an arithmetic unit.

5. A method according to claim 4 wherein the drive signal is deposited in a memory.

6. A method according to claim 1 wherein a special, non-linear or non-classic damping agent is employed.

7. A method according to claim 1 wherein the time function is generated by a closed loop control system to which the respective position of the nozzle is supplied as actual value.

8. In a liquid jet printer having a nozzle and means for moving said nozzle through an angle for producing a resultant velocity of a writing fluid from said nozzle toward a separate writing location on a recording medium, said printer having a capillary system including said nozzle for generating a stream of said writing fluid of constant strength which is directed onto said recording medium, means for producing a relative motion between the nozzle of the capillary system and the recording medium in two directions disposed substantially perpendicular to one another, and means for effecting one direction of relative motion by moving the capillary system through an angle around a rotational axis from which the orifice of the nozzle of the capillary system has a finite spacing in the direction toward the recording medium, the improvement comprising:
   a modulation means for changing the angular velocity of the nozzle for discontinuous transition of the writing stream from one point to another point disposed at a distance from said one point according to a selected time function such that the fluid, after departing the nozzle, is always approximately directed toward the other point through substantially the entire angle between the two points for preventing printing of said fluid on said recording medium between said two points.

9. A liquid jet printer according to claim 8 further comprising means for overdamping the capillary system.

10. A liquid jet printer according to claim 8 further comprising means for selecting the drive signal, the spacing of the nozzle orifice from the rotational axis, the resonant frequency of the system, the velocity component along the nozzle axis and the damping coefficient of said capillary system are matched to one another for generating the selected time function.

11. In a method for generating at least two separately disposed points on a recording medium of a liquid jet printer, wherein writing fluid is continuously supplied from a nozzle in the direction toward the recording medium with a prescribable speed and, for the purpose of changing between the points, the jet is subject to high speed movement through an angle corresponding to the spacing between the points, the improvement comprising:
   applying a driving signal to the printer for moving the nozzle for directing writing fluid from a first point to a second non-adjacent point on said recording medium; and
   correlating the waveform of the driving signal with selected parameters of the printer such that the nozzle is abruptly accelerated to impart to the writing fluid leaving the nozzle a resultant velocity always directed substantially toward the second point as said nozzle moves through said angle, for preventing printing of said writing fluid on said recording medium between said points.

12. A method according to claim 11 wherein the step of correlating said waveform is further defined by said driving signal being initially substantially a step function, and selecting the parameters of the printer such that after a time lag of less than twenty microseconds the writing fluid skips a substantial intervening space between the two points and abruptly begins impinging near the second point on said recording medium while the jet has completed less than twenty percent of its movement through said angle.

13. A method according to claim 11 wherein the step of correlating said waveform is further defined by conforming the driving signal substantially to a driving time function which asymptotically approaches a limit value over a final 70% of said time function and which has an abrupt steeply sloping region of a duration less than 30% of the duration of the time function.

14. A method according to claim 11, wherein the step of correlating said waveform is done by a closed loop control system to which the instantaneous position of the nozzle is supplied as a feedback value.

15. In a method for operating a liquid jet printer for generating at least two punctiform curves representing separate electrical signals on a moving recording medium, said curves being spaced from each other in a direction substantially perpendicular to the direction of movement of movement of said recording medium, said liquid jet printer having a nozzle for continuously discharging writing liquid toward said moving recording medium, and said method including moving said nozzle repeatedly at high speed through an angle for alternatingly directing said nozzle at spaced locations on said medium for printing said two curves, the improvement comprising:

moving said nozzle through said angles according to a selected time function such that said writing fluid discharged from said nozzle always moves in a direction toward one of said locations after said nozzle begins movement away from the other of said locations for preventing printing of writing fluid on said recording medium between said two locations of said curves.

16. In a liquid jet printer for generating at least two punctiform curves representing separate electrical signals, said printer having a recording medium, means for moving said recording medium, said curves being spaced from each other in a direction substantially perpendicular to the direction of movement of said recording medium, a nozzle for continuously discharging writing fluid toward the moving recording medium, and means for moving said nozzle through an angle for alternatingly directing said nozzle at spaced locations on said medium for printing said two curves, the improvement comprising:

means for moving said nozzle through said angle according to a selected time function such that said writing fluid discharged from said nozzle always moves in a direction toward one of said locations after said nozzle begins movement away from the other of said locations for preventing printing of writing fluid on said recording medium between said two locations of said curves.

* * * * *